(12) United States Patent
Allen et al.

(10) Patent No.: US 9,943,070 B1
(45) Date of Patent: Apr. 17, 2018

(54) WIRELESS REMOTELY CONTROLLED VISUAL TARGET FOR TRAINING HORSES

(76) Inventors: Charles Allen, Stephenville, TX (US); Lewis Collins, Stephenville, TX (US)

( * ) Notice: Subject to any disclaimer, the term of this patent is extended or adjusted under 35 U.S.C. 154(b) by 469 days.

(21) Appl. No.: 12/862,595

(22) Filed: Aug. 24, 2010

(51) Int. Cl.
*A01K 15/02* (2006.01)
*A01K 29/00* (2006.01)

(52) U.S. Cl.
CPC ............ *A01K 15/027* (2013.01); *A01K 29/00* (2013.01)

(58) Field of Classification Search
CPC ..................................... A01K 15/027
USPC .................................. 119/702, 839
See application file for complete search history.

(56) References Cited

U.S. PATENT DOCUMENTS

| 1,247,126 | A  | * | 11/1917 | Maisel ........................... 446/279 |
| 6,039,628 | A  | * | 3/2000  | Kusmiss et al. ............... 446/457 |
| 7,984,910 | B1 | * | 7/2011  | Nielsen .......................... 273/359 |
| 2004/0094897 | A1 | * | 5/2004 | Barnett .......................... 273/445 |
| 2006/0150918 | A1 | * | 7/2006 | Rowe ............................. 119/707 |
| 2007/0017456 | A1 | * | 1/2007 | Huett ............................. 119/839 |

* cited by examiner

*Primary Examiner* — Joshua D Huson
(74) *Attorney, Agent, or Firm* — Shiells Law Firm P.C.; Theodore F. Shiells (57) ABSTRACT

The present invention provides for a motorized carriage for supporting and transporting a representation of a barrel which can be used as a visual target for a barrel or cutting horse. The carriage is provided with a pair of treads for making contact with and moving the carriage over the ground. The pair of treads is coupled to a driving mechanism having two motors, each coupled to one of the treads via a drive mechanism. The drive mechanism may be a chain-drive mechanism, a belt-drive, a gear-drive, a direct drive or other mechanism. The motorized carriage may include a radio receiver for remote control of the motors.

13 Claims, 7 Drawing Sheets

WIRELESS REMOTELY CONTROLLED VISUAL TARGET FOR TRAINING HORSES

BACKGROUND OF THE INVENTION

Field of the Invention

The present invention relates to apparatus for training horses and, more particularly, to a motorized apparatus used to train horses for "cutting" or separating cows from a herd, and to train horses for barrel racing.

Description of the Related Art

Cutting horses are utilized to separate a cow from a herd of cows and thereafter to control their movements. A cow is typically confronted head-on by the cutting horse and its rider. The horse and rider continuously confront the separated cow to block motion by the cow except toward a desired location. Although cutting horses were widely utilized in the past in everyday cattle ranching operations, they are now used primarily for sport and hobby applications.

Effective cutting horses must be trained to confront and continuously face a target cow, which will exhibit erratic movements as it attempts to evade the cutting horse. Live cows may only be used in horse-training sessions a few times each before they become accustomed to the cutting activity and learn to react inappropriately. Several mechanical devices have therefore been developed for use in training cutting horses, in which an artificial or simulated animal is used as the target for the cutting horse and rider. Some of these devices feature an artificial cow suspended from a moving cable or mounted for limited movement along a track-like arrangement. Some early devices featured an artificial cow mounted to a pneumatically-controlled boom capable of limited forward-and-back or side-to-side movement. Other such devices provide motor-driven carriages on wheels, upon which an artificial cow can be mounted.

The same breeds of horses that are used for cutting cows tend to be used for barrel racing, because quick, left and right movements are required in both activities. Although a barrel horse is rarely used for cutting cows, it is required to move and react much like a cutting horse except at faster speeds, and the object that they are quickly turning around is stationary.

Although many aspects of training cutting horses and barrel horses are comparable, a different motorized device is required for both events, because of the difference in appearance of both objects, and how they move. Horses are intelligent animals and are also subject to psychological influences. It has been found that horses trained for barrel racing have learned to expect that the barrel is stationary. Thus, the horse learns to optimize its motions with the expectation that the barrel stays in one place. In order to prevent such psychological expectations, a motorized apparatus similar to a barrel that moves in different directions is used to alleviate the monotony of training directed toward a stationary object.

Many of the same principles apply to the training of a cutting horse, except that during training of a cutting horse, and during cutting horse competition, the cow is generally always moving in different directions. Thus, there is a need for a motorized apparatus very similar to a cow with the same mobile capabilities as a live cow.

Since cutting horse and barrel racing, training, and competitions are typically performed on the ground, in dirt or upon grass, the use of wheeled carriages or similar wheeled apparatus can become problematic due to "off-road" conditions. The ground can become very uneven due to the action of horses' hooves in the dirt, and due to the action of rain, wind and sunshine upon the dirt. Wheeled carriages, particularly three-wheeled carriages, are less stable on hard, uneven ground than upon smooth, level ground, and may be prone to overturn or bog down. The typical response to such difficulties is to make the wheels larger, but there are practical size limitations to be encountered in such as response. Furthermore, horses can be "spooked" by wheeled vehicles, which the horse associates with automobiles.

SUMMARY OF THE INVENTION

The present invention provides a motorized carriage for supporting and transporting a representation of an animal, such as a cow, or a barrel which can be used as a visual target for a horse. The carriage is provided with a pair of treads for making contact with and moving the carriage over the ground. The pair of treads is coupled to a driving mechanism having two motors, each coupled to one of the treads via a drive mechanism. The drive mechanism may be a chain-drive mechanism, a belt-drive, a gear-drive, a direct drive or other mechanism. The motorized carriage may include a radio, infrared, ultrasonic or other wireless receiver for remote control of the motors.

BRIEF DESCRIPTION OF THE DRAWINGS

For a more complete understanding of the present invention and the advantages thereof, reference is now made to the following Detailed Description taken in conjunction with the accompanying drawings, in which.

DETAILED DESCRIPTION

In the following discussion, numerous specific details are set forth to provide a thorough understanding of the present invention. However, those skilled in the art will appreciate that the present invention may be practiced without such specific details. In other instances, well-known elements have been illustrated in schematic or block diagram form in order not to obscure the present invention in unnecessary detail. Additionally, for the most part, specific details, and the like have been omitted inasmuch as such details are not considered necessary to obtain a complete understanding of the present invention, and are considered to be within the understanding of persons of ordinary skill in the relevant art.

Figure 1:
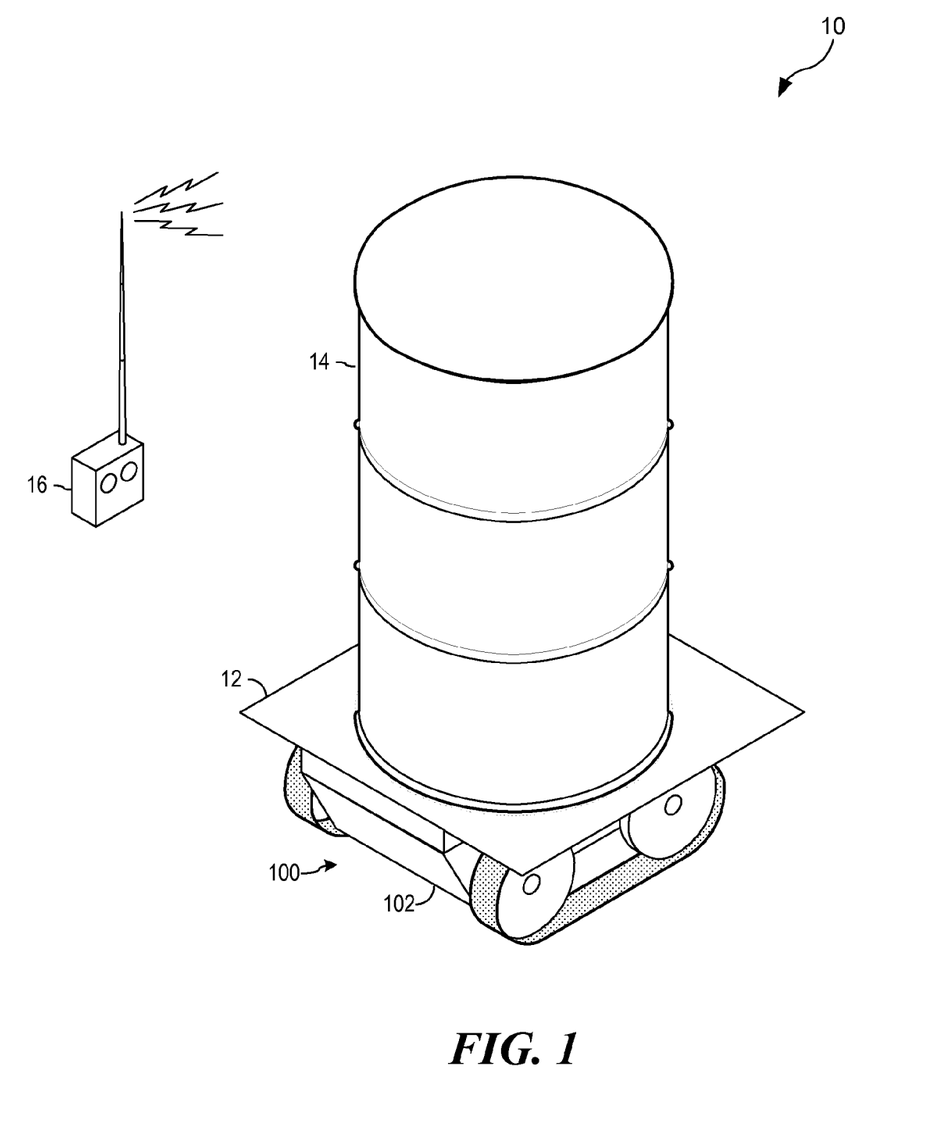
FIG. 1 is a perspective view of an apparatus for training barrel horses in accordance with an aspect of the present invention.
Figure 10:
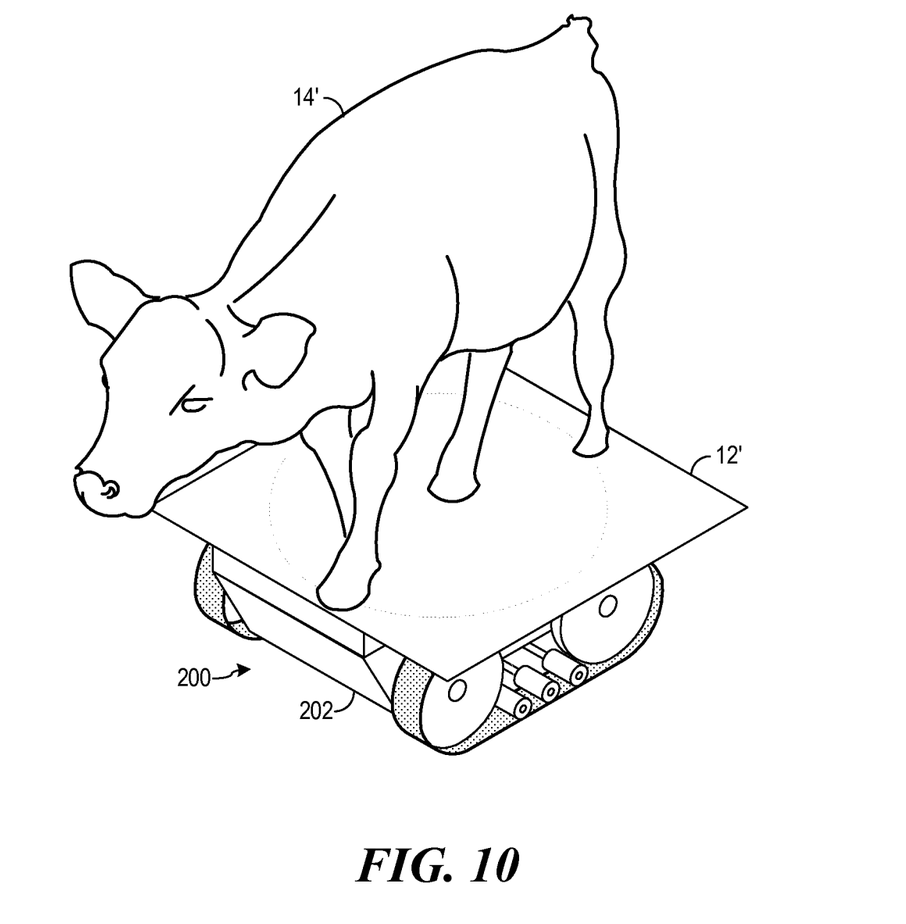
FIG. 10 is a perspective view of an apparatus for training cutting horses in accordance with another aspect of the present invention.

Referring to the drawings, and beginning with FIG. 1, reference numeral 10 generally designates an apparatus for training barrel horses in accordance with an aspect of the present invention. The apparatus 10 comprises a motorized carriage 100 having a platform 12 for supporting a visual target 14, wherein the visual target 14 may be a barrel as shown in FIG. 1, a representation of an animal (such as a live calf that would be used in actual calf cutting) as shown in FIG. 10, or any other suitable visual target. The visual target 14 may be secured to the platform 12 by any suitable fastening or securing means. The motorized carriage 100 comprises a generally rectangular, longitudinally extending chassis 102, the chassis being provided with a driving mechanism coupled thereto, and presently to be described, and a control system for executing various patterns of movement of the apparatus 10 in accordance with control signals emitted from a remote radio transmitter 16.

The present inventors have discovered that training a barrel horse can be most effectively accomplished by using a barrel has the visual target 14. In this way, the horse will view the track-bearing, carriage-mounted barrel as similar to the already-learned, stationary barrel activity. The trainer can then gradually introduce movement of the track-bearing, carriage-mounted barrel to the activity.

Figure 2:
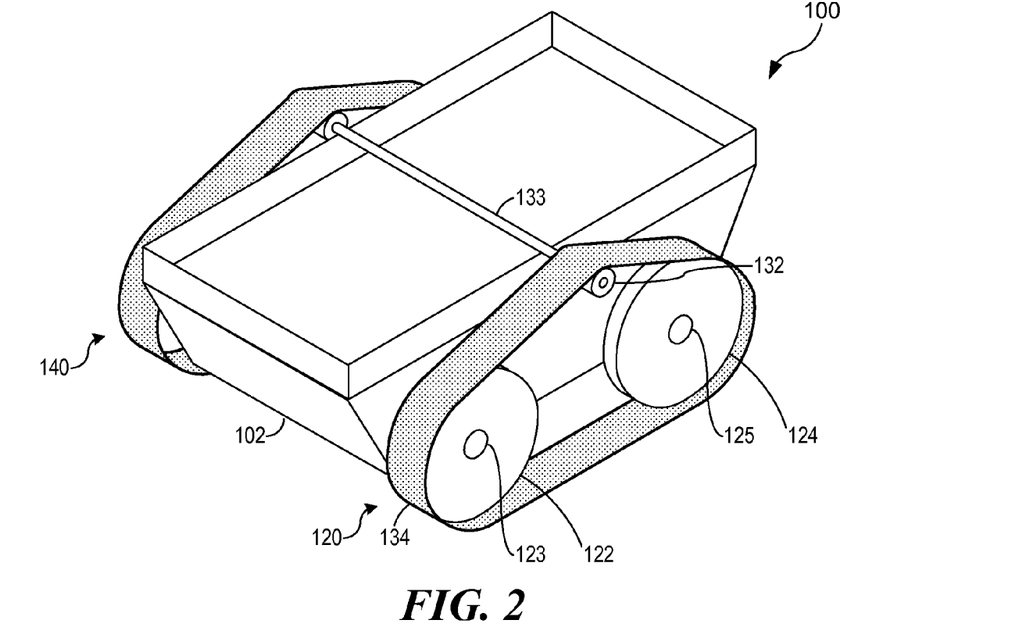
FIG. 2 is a perspective view of a motorized carriage according to an aspect of the present invention.

Turning now to FIG. 2, in accordance with an aspect of the present invention, the driving mechanism coupled to chassis 102 of motorized carriage 100, has a first tread mechanism 120 and a second tread mechanism 140 each coupled to a different side of the chassis 102. Each tread mechanism may be identical to the other, in view of which only one tread mechanism will be described. Each tread mechanism 120, 140 may have a first driving wheel 122 rotatively mounted upon an axle 123 near a first end of chassis 102 and a second idle or driven wheel 124 rotatively mounted upon an axle 125 near a second end of chassis 102. Each tread mechanism 120, 140 may further have an idler wheel 132 mounted upon one end of an idler axle 133, idler axle(s) 133 may be mounted at or near the top of, and approximately midway between the first and second ends of, chassis 102. Each tread mechanism may further have a tread 134 passing circumferentially around the outsides of first and second driving/idler wheels 122, 124 and around the outsides of idler wheel 132. Each tread may take the form of a flexible, endless loop having features on the outside of the tread 134 for obtaining traction against the ground upon which the apparatus 10 may be operated, and having features on the inside of the tread 134 for interacting with first and second driving/idler wheels 122, 124. The interaction of tread 134 with first and second driving/idler wheels 122, 124 comprises the coupling of motive power from driving wheel 122 to tread 134. Each tread 134 of each tread mechanism 120, 140 may be operated independently and may be driven in a forward direction or a reverse direction, and at varying speeds. The art of driving a vehicle or carriage upon independently-operated treads is well known, and need not be described further herein.

Figure 3:
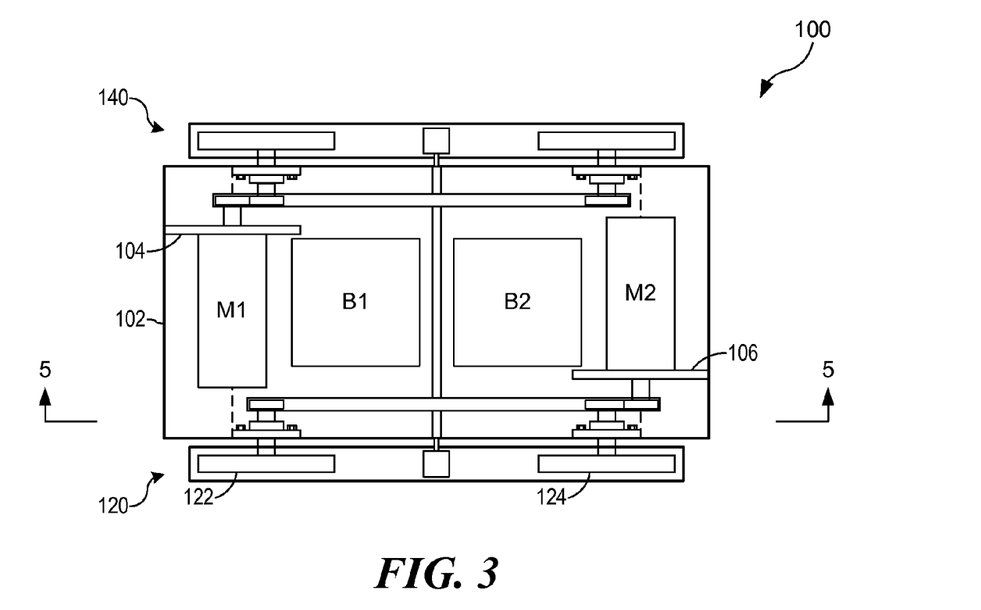
FIG. 3 is a simplified plan view of a motorized carriage according to an aspect of the present invention.

Turning now to FIG. 3, the generally rectangular, longitudinally extending chassis 102 comprises an enclosure having a bottom and four sides, wherein the top of the enclosure may be open. The enclosure may be constructed of steel panels welded together into a desired configuration. The chassis 102 may also comprise a first interior bulkhead 104 and a second interior bulkhead 106. Each interior bulkhead 104, 106 may comprise a steel panel welded to the interior of the chassis 102 enclosure. Each interior bulkhead 104, 106 may also be provided with apertures formed therein to facilitate mounting additional components of carriage 100. The enclosure of chassis 102 may also be provided with additional apertures and other mounting features as required for mounting further additional components of carriage 100.

Figure 4:
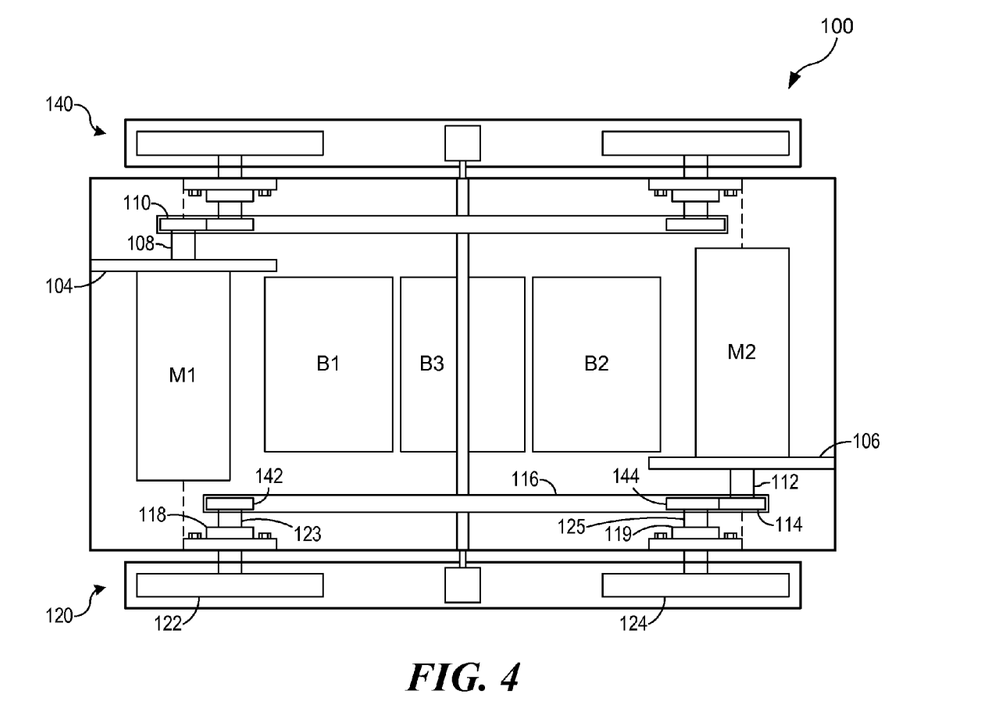
FIG. 4 is another plan view of the motorized carriage.

Turning now to FIG. 4, a first motor M1 may be a reversible electric motor mounted to interior bulkhead 104 and secured to apertures formed in bulkhead 104 by means of screws or other suitable fasteners. First motor M1 preferably includes an output shaft 108 extending through an aperture formed within interior bulkhead 104 Upon a distal end of output shaft 108 may be mounted a first rotatable driving member, such as a first sprocket 110. A second motor M2 may be a reversible electric motor mounted to interior bulkhead 106 and secured to apertures formed in bulkhead 106 by means of screws or other suitable fasteners. Second motor M2 preferably includes an output shaft 112 extending through an aperture formed within interior bulkhead 106. Upon a distal end of output shaft 112 may be mounted a second rotatable driving member, such as a second sprocket 114. Motors M1 and M2 may preferably be driven for rotation of their respective output shafts 108 and 112 in either a first rotating direction or a second, opposite rotating direction by application of electric power in either a first electrical polarity or a second, opposite electrical polarity. A digital controller and stepping motors may also be used. Operation of the motorized carriage 100 may be effected to cause motion of the carriage 100 in a first, forward direction, or in a second, reverse direction, or to steer the motorized carriage 100 to alter either the first, forward direction or the second, reverse direction, by proper application of electric power in the appropriate electrical polarity to either or both reversible electric motors M1, M2.

Figure 5:
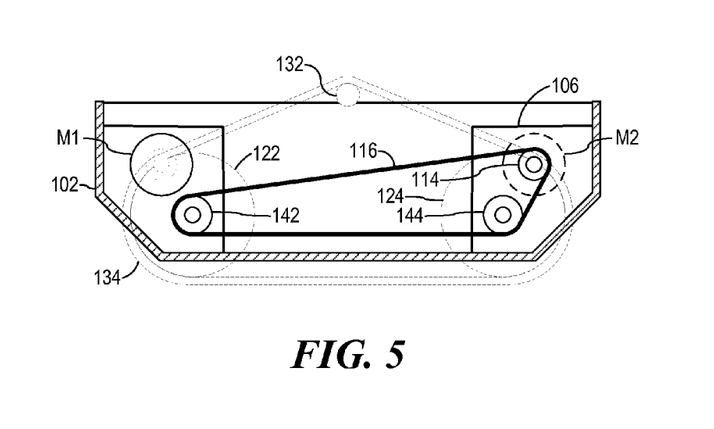
FIG. 5 is a simplified sectional view of a motorized carriage according to an aspect of the present invention, taken along the lines 5-5 in FIG. 3.

Motive power for the motorized carriage 100 may be provided by operation reversible electric motors M1 and M2. In order to couple motive power from the motors M1 or M2 to a final driving element, an intervening mechanical driving apparatus may provided for each motor M1 and M2. Each intervening mechanical driving apparatus may be identical to the other, in view of which only one intervening mechanical driving apparatus will be described. With reference now to FIG. 5 and FIG. 4, an intervening mechanical driving apparatus as provided for motor M2 may comprise a flexible loop driving member 116, such as a chain comprising links coupled together in the form of an endless loop. Alternatively, the flexible loop driving member 116 may comprise an endless-loop drive belt such as commonly used in automotive applications as a fan belt or a serpentine belt. The flexible loop driving member 116 may individually couple motive power from motor M2 to tread 134 as described hereinafter.

To couple motive power from motor M2 to tread 134, flexible loop driving member 116 may be coupled to a rotatable driving member such as sprocket 114 mounted upon the end of rotating shaft 112 of motor M2, and may further be coupled to further rotatable driving members such as sprockets 142 and 144 mounted upon the ends of axles 123 and 125, respectively. As shown in FIG. 4, first driving wheel 124 may be fixedly mounted on one end of axle 123, which is rotatively supported in bearing assembly 118. Sprocket 142 may be fixedly mounted to the other end of axle 123 such that rotation of sprocket 142 causes concomitant rotation of first driving wheel 122. Similarly, second driving wheel 124 may be fixedly mounted on one end of axle 125, which is rotatively supported in bearing assembly 119. Sprocket 144 may be fixedly mounted to the other end of axle 125 such that rotation of sprocket 144 causes concomitant rotation of first driving wheel 124. As shown in FIG. 5, wherein elements of tread mechanism 120 are shown in dashed lines for reference, flexible loop driving member 116 passes circumferentially around the outsides of, and engages the rotatable driving members such as motor sprocket 114 and driving wheel sprockets 142, 144. Where the flexible loop driving member may be a drive belt as opposed to a drive chain, then sprockets 114, 142 and 144 may be replaced with alternative rotatable driving members, such as pulleys having a profile suitable for engaging a drive belt, as is known in the art. Therefore, as motor M2 rotates its output shaft 112, motor sprocket 114 rotates and engages with flexible loop drive member 116 to drive wheel sprockets 142 and 144, thereby rotating first and second driving wheel 122 and 124, respectively, which in turn drives tread 134 to move the motorized carriage 100 over the ground. As shown in FIG. 4, a separate and similar intervening mechanical driving apparatus is provided to couple motive power from motor M1 to second tread mechanism 140.

Figures 6, 7, 8:
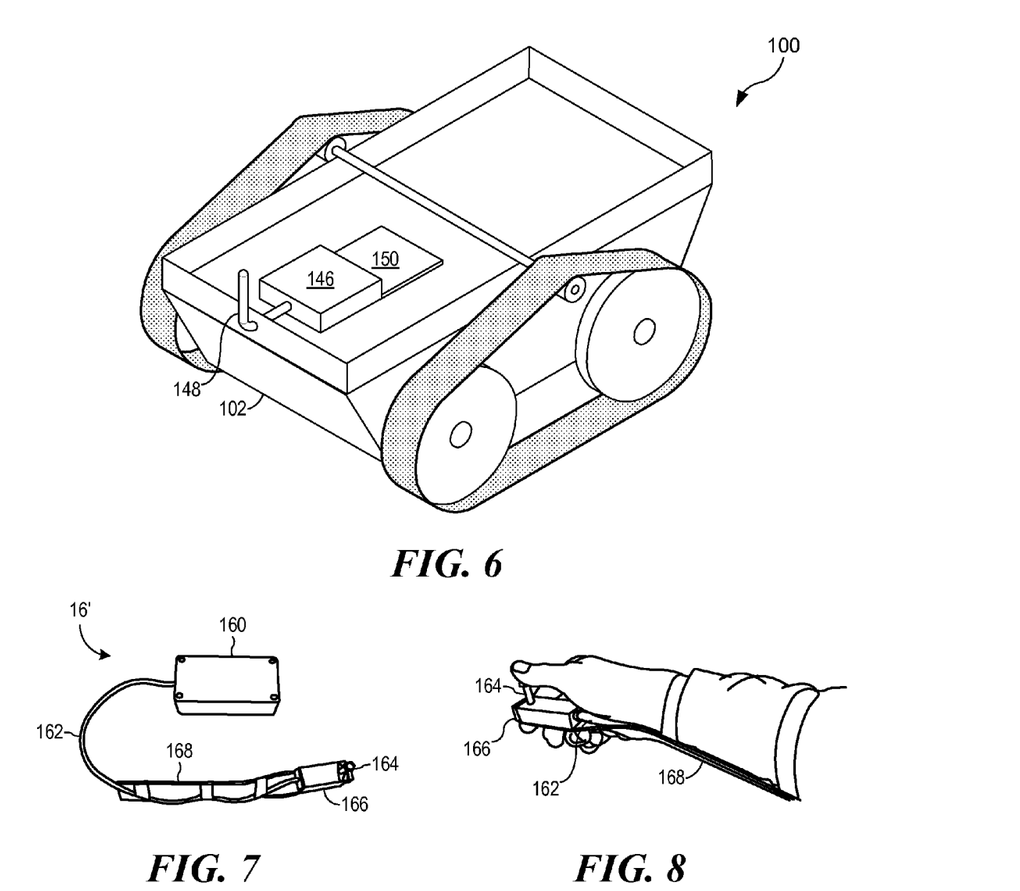
FIG. 6 is a perspective view of a motorized carriage according to an aspect of the present invention.
FIG. 7 is a perspective view of a remote-control radio transmitter for use with the present invention.
FIG. 8 is a perspective view of a control device of a remote-control radio transmitter for use with the present invention.

Turning now to FIG. 6, the motorized carriage 100 may be provided with a radio receiver 146 coupled to an antenna 148 for receiving control signals from a remote, radio-control transmitter 16 (FIG. 1). Radio receiver 146 may be provided with electrical power from batteries B1 and/or B2, or may be provided with its own battery. A motor control circuit 150 may be coupled to radio receiver 146 to receive control signals from remote, radio-control transmitter 16 via radio receiver 146. The motor control circuit 150 may be coupled to batteries B1 and B2 to receive electrical power therefrom, and may also be coupled to motors M1 and M2 to selectively provide electrical power thereto. According to an aspect of the present invention, the motor control circuit 150 is operable to apply DC electrical power to motors M1 and M2 in either positive or negative polarity, and at variable voltages, to control the speed and direction of each motor and thereby, through mechanical coupling of the motors M1 and M2 to the driving mechanisms including tread mechanisms 120 and 140, to control the speed and direction of motion of the motorized carriage 100. The techniques required to accomplish such individual control of motors B1 and B2 via electronic means, including any wiring or cabling, electrical insulation, shock-proof and/or weather-proof mounting of electrical and electronic components, is well known in the art and need not be described further herein.

Turning now to FIG. 7, an alternate form of remote-control radio transmitter 16' may be housed in a small enclosure 160 having a cable assembly 162 exiting from the enclosure 160 and connecting to a manual control device 164. The manual control device 164 may be a joystick mounted to its own small enclosure 166 and operable to vary two or more small potentiometers coupled to the transmitter 160 via cable assembly 162. Alternatively, the manual-control device may utilize push-button switches or other electrical controls as desired. The specific techniques required to utilize such electrical control devices coupled to a remote-control radio transmitter are well known in the art. Enclosure 166 and control device 164 may be mounted to a supporting member 168, which may be a shaped and contoured bar of metal, or other material, and configured to be strapped to a forearm of a person such as a rider on horseback, as shown for example in FIG. 8.

Figure 9:
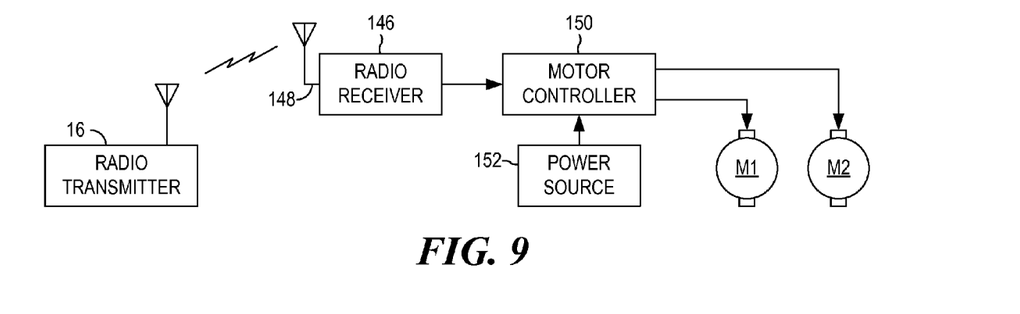
FIG. 9 is a simplified block diagram of an electrical control system according to an aspect of the present invention.

Turning now to FIG. 9, a control system for the motorized carriage may comprise a radio receiver 146 coupled to an antenna 148 for receiving radio control signals from a remote-control radio transmitter 16. Radio receiver 146 is coupled to and provides output signals to a motor controller 150, which is coupled to a power source 152. The power source 152 may comprise one or more batteries such as B1, B2 as shown in FIG. 3. The motor controller 150 is further coupled to first motor M1 and to second motor M2. The motor controller 150 is operable to selectively energize motors M1 and M2 in response to radio control signals received via radio receiver 146 from remote-control radio transmitter 16. The specific techniques of remote control of a motorized carriage via radio control signals is well known in the art and need not be described further herein.

Figure 11:
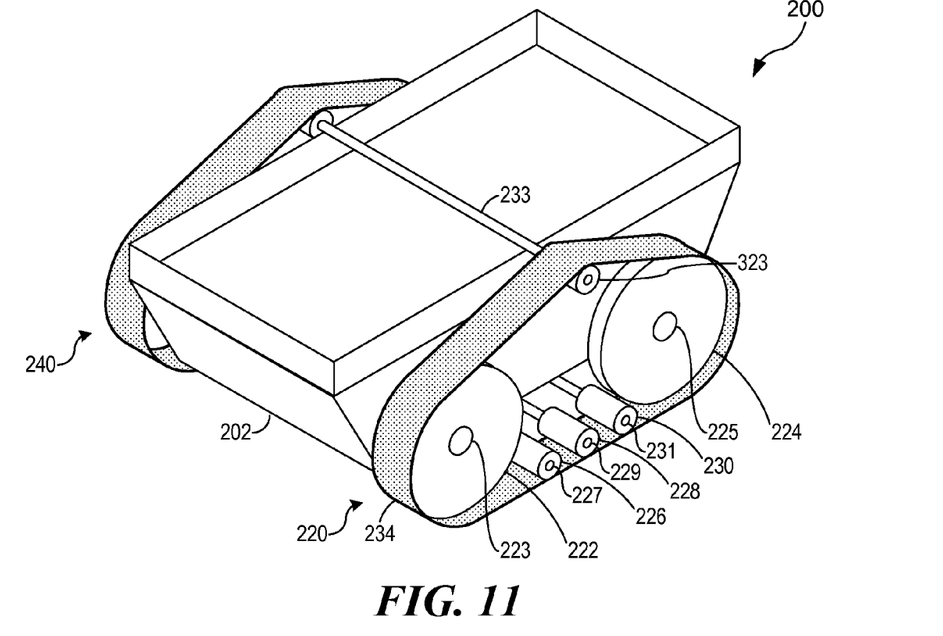
FIG. 11 is a perspective view of a motorized carriage according to another aspect of the present invention.

Training a cutting horse can be most effectively accomplished by using a cow as the visual target, as shown in FIG. 10. In this way, the horse will view the track-bearing, carriage-mounted cow as a real live cow. FIG. 10 is a perspective view of an apparatus 200 for training cutting horses in accordance with another aspect of the present invention. In this embodiment, Turning now to FIG. 11, in accordance with an aspect of the present invention, the driving mechanism coupled to chassis 202 of motorized carriage 200, has a first tread mechanism 220 and a second tread mechanism 240 each coupled to a different side of the chassis 202. Each tread mechanism may be identical to the other, in view of which only one tread mechanism will be described. Each tread mechanism 220, 240 may have a first driving wheel 222 rotatively mounted upon an axle 223 near a first end of chassis 202 and a second idle or driven wheel 224 rotatively mounted upon an axle 225 near a second end of chassis 202. Each tread mechanism 220, 240 may further have an upper idler wheel 232 mounted upon one end of an idler axle 233, idler axle(s) 233 may be mounted at or near the top of, and approximately midway between the first and second ends of, chassis 202. Each tread mechanism may further have a tread 234 passing circumferentially around the outsides of first and second driving/idler wheels 222, 224 and around the outsides of idler wheel 232. Each tread may take the form of a flexible, endless loop having features on the outside of the tread 134 for obtaining traction against the ground upon which the apparatus 200 may be operated, and having features on the inside of the tread 234 for interacting with first and second driving/idler wheels 222, 224. As depicted in FIG. 11, additional, lower, idler wheels 226, 228 and 230, which rotate on respective axels 227, 229 and 231, can be provided at an inside face of the bottom loop of tread 234 to help keep the tread 234 flat, so as to make better contact with the ground. The interaction of tread 234 with first and second driving/idler wheels 222, 224 comprises the coupling of motive power from driving wheel 222 to tread 234. Each tread 234 of each tread mechanism 220, 240 may be operated independently and may be driven in a forward direction or a reverse direction, and at varying speeds. The art of driving a vehicle or carriage upon independently-operated treads is well known, and need not be described further herein.

Figure 13:
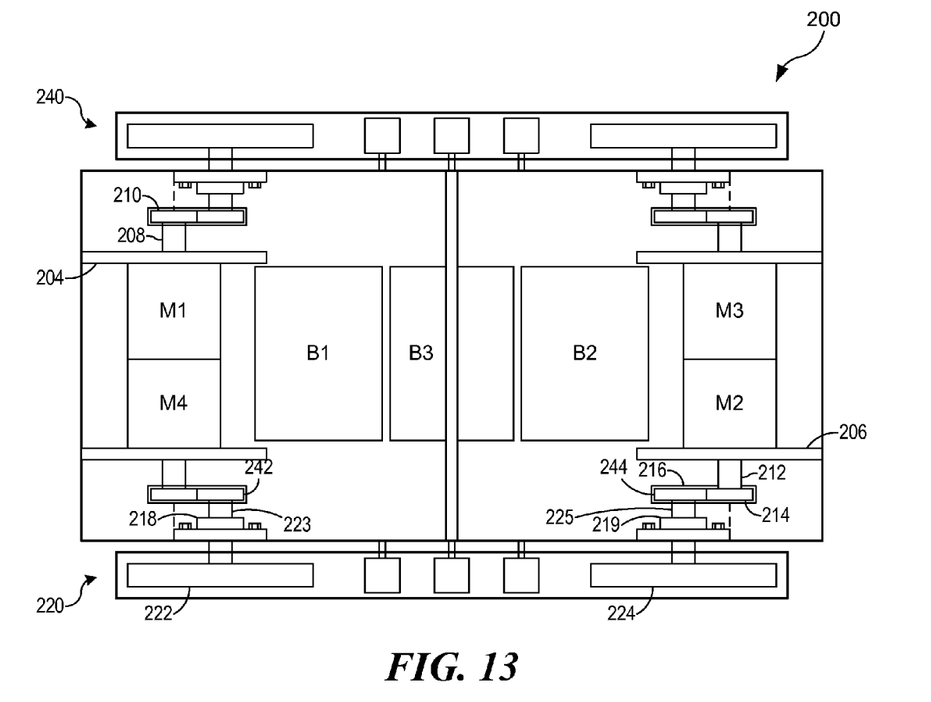
FIG. 13 is another plan view of the motorized carriage.

Turning now to FIG. 13, the generally rectangular, longitudinally extending chassis 202 comprises an enclosure having a bottom and four sides, wherein the top of the enclosure may be open. The enclosure may be constructed of steel panels welded together into a desired configuration. The chassis 202 may also comprise a first interior bulkhead 204 and a second interior bulkhead 206. Each interior bulkhead 204, 206 may comprise a steel panel welded to the interior of the chassis 202 enclosure. Each interior bulkhead 204, 206 may also be provided with apertures formed therein to facilitate mounting additional components of carriage 200. The enclosure of chassis 202 may also be provided with additional apertures and other mounting features as required for mounting further additional components of carriage 200.

Figure 12:
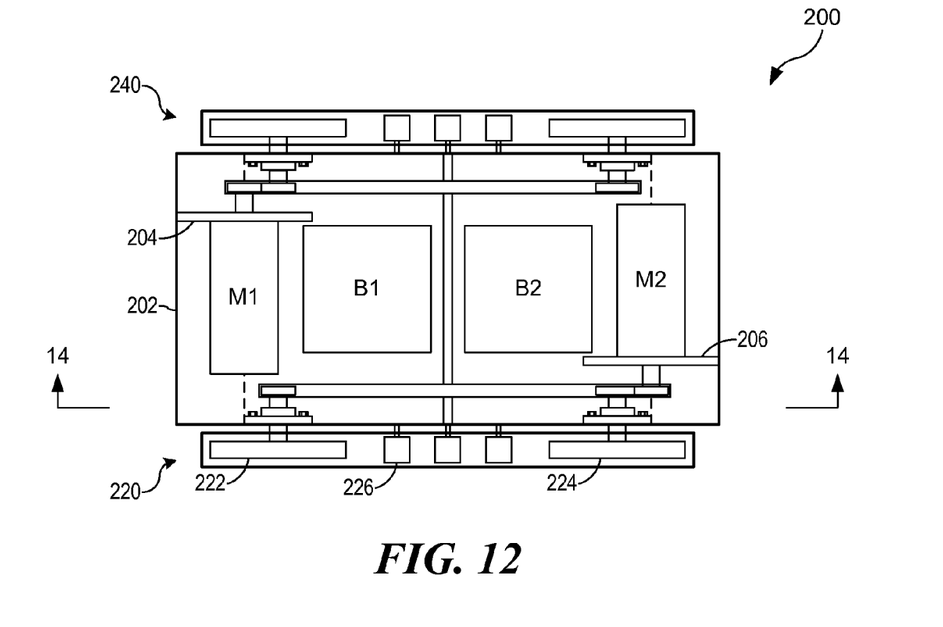
FIG. 12 is a simplified plan view of a motorized carriage according to another aspect of the present invention.

Turning now to FIG. 12, in one embodiment, there can be two motors for each of the tread mechanisms 220 and 240. In this embodiment, first motor M1 and third motor M3 can drive tread mechanism 240 and second motor M2 and fourth motor M4 can drive tread mechanism 220. Motors M1 to M4 may be reversible electric motors. Motors M1 to M4 can be mounted to interior bulkhead 204 and secured to apertures formed in bulkhead 204 by means of screws or other suitable fasteners. First motor M1 and fourth motor M4 each preferably includes an output shaft 208 extending through an aperture formed within interior bulkhead 204 Upon a distal end of output shaft 208 may be mounted a first rotatable driving member, such as a first sprocket 210. The second motor M2 and the third motor M3 may be reversible electric motors mounted to interior bulkhead 206 and secured to apertures formed in bulkhead 206 by means of screws or other suitable fasteners. Second motor M2 and third motor M3 preferably include an output shaft 212 extending through an aperture formed within interior bulkhead 206. Upon a distal end of output shaft 212 may be mounted a second rotatable driving member, such as a second sprocket 214. Motors M1 to M4 may preferably be driven for rotation of their respective output shafts 208 and 212 in either a first rotating direction or a second, opposite rotating direction by application of electric power in either a first electrical polarity or a second, opposite electrical polarity. A digital controller and stepping motors may also be used. Operation of the motorized carriage 200 may be effected to cause motion of the carriage 200 in a first, forward direction, or in a second, reverse direction, or to steer the motorized carriage 200 to alter either the first, forward direction or the second, reverse direction, by proper application of electric power in the appropriate electrical polarity to reversible electric motors M1 to M4. It should be noted, however, that in this embodiment, motors M2 and M4 would be "paired" to run substantially synchronously, since they both drive tread mechanism 220 and motors M1 and M3 would be "paired" to run substantially synchronously, since they both drive tread mechanism 240.

Figure 14:
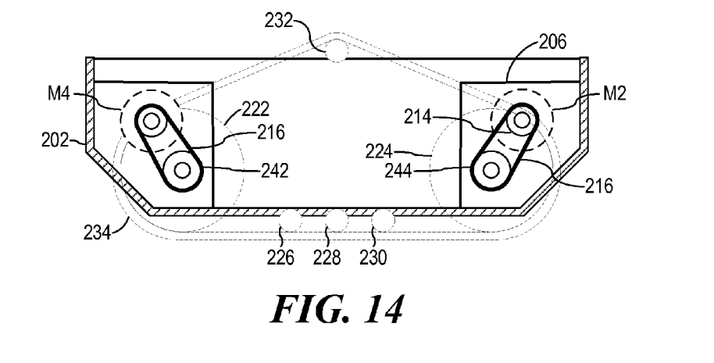
FIG. 14 is a simplified sectional view of a motorized carriage according to an aspect of the present invention, taken along the lines 14-14 in FIG. 12.

Motive power for the motorized carriage 200 may be provided by operation reversible electric motors M1 to M4. In order to couple motive power from the motors M1 to M4 to their respective final driving elements, an intervening mechanical driving apparatus may provided for each motor M1 to M4 Each intervening mechanical driving apparatus may be identical to the other, in view of which only one intervening mechanical driving apparatus will be described. With reference now to FIG. 14 and FIG. 13, an intervening mechanical driving apparatus as provided for motors M1 to M4 may comprise flexible loop driving members 216, such as chains comprising links coupled together in the form of an endless loop. Alternatively, the flexible loop driving members 216 may comprise endless-loop drive belts such as commonly used in automotive applications as fan belts or a serpentine belts. The flexible loop driving members 216 may individually couple motive power from respective motors M1 to M4 to their respective treads 234 on either side of apparatus 200.

To couple motive power from motors M2 and M4 to tread 234, flexible loop driving members 216 may be coupled to a rotatable driving member such as sprocket 214 mounted upon the end of rotating shaft 212 of motor M2 and sprockets 242 and 244 mounted upon the ends of axles 223 and 225, respectively, which are driven by motor M4. As shown in FIG. 13, first driving wheel 224 may be fixedly mounted on one end of axle 223, which is rotatively supported in bearing assembly 218. Sprocket 242 may be fixedly mounted to the other end of axle 223 such that rotation of sprocket 242 causes concomitant rotation of first driving wheel 222. Similarly, second driving wheel 224 may be fixedly mounted on one end of axle 225, which is rotatively supported in bearing assembly 219. Sprocket 244 may be fixedly mounted to the other end of axle 225 such that rotation of sprocket 244 causes concomitant rotation of first driving wheel 224. As shown in FIG. 14, wherein elements of tread mechanism 220 are shown in dashed lines for reference, flexible loop driving member 216 passes circumferentially around the outsides of, and engages the rotatable driving members such as motor sprocket 214 and driving wheel sprockets 242, 244. Where the flexible loop driving member may be a drive belt as opposed to a drive chain, then sprockets 214, 242 and 244 may be replaced with alternative rotatable driving members, such as pulleys having a profile suitable for engaging a drive belt, as is known in the art. Therefore, as motor M2 rotates its output shaft 212, motor sprocket 214 rotates and engages with flexible loop drive member 216 to drive wheel sprockets 242 and 244, thereby rotating first and second driving wheel 222 and 224, respectively, which in turn drives tread 234 to move the motorized carriage 200 over the ground. As shown in FIG. 13, a separate and similar intervening mechanical driving apparatus is provided to couple motive power from motor M1 to second tread mechanism 240.

Turning now to FIG. 11, the motorized carriage 200 may be provided with a radio receiver 246 coupled to an antenna 248 for receiving control signals from a remote, radio-control transmitter 26 (FIG. 1). Radio receiver 246 may be provided with electrical power from batteries B1 and/or B2, or may be provided with its own battery. A motor control circuit 250 may be coupled to radio receiver 246 to receive control signals from remote, radio-control transmitter 26 via radio receiver 246. The motor control circuit 250 may be coupled to batteries B1 and B2 to receive electrical power therefrom, and may also be coupled to motors M1 and M2 to selectively provide electrical power thereto. According to an aspect of the present invention, the motor control circuit 250 is operable to apply DC electrical power to motors M1 and M2 in either positive or negative polarity, and at variable voltages, to control the speed and direction of each motor and thereby, through mechanical coupling of the motors M1 and M2 to the driving mechanisms including tread mechanisms 220 and 240, to control the speed and direction of motion of the motorized carriage 200. The techniques required to accomplish such individual control of motors B1 and B2 via electronic means, including any wiring or cabling, electrical insulation, shock-proof and/or weather-proof mounting of electrical and electronic components, is well known in the art and need not be described further herein.

Either remote-control 16 or the alternate form of remote-control radio transmitter 16' and the control system depicted in FIG. 9, and previously described, may be used to control the cow-shaped target 14' embodiment depicted in FIGS. 10-14.

Having thus described the present invention by reference to certain of its preferred embodiments, it is noted that the embodiments disclosed are illustrative rather than limiting in nature and that a wide range of variations, modifications, changes, and substitutions are contemplated in the foregoing disclosure and, in some instances, some features of the present invention may be employed without a corresponding use of the other features. Many such variations and modifications may be considered desirable by those skilled in the art based upon a review of the foregoing description of preferred embodiments. Accordingly, it is appropriate that the appended claims be construed broadly and in a manner consistent with the scope of the invention.

The invention claimed is:

1. An apparatus for training horses, comprising:
a motor-driven carriage, comprising:
first and second flexible treads disposed on either side of the carriage and wherein at least a portion of each tread may contact the ground and wherein each of said first and second flexible treads forms a loop which is generally elongated in the front to back direction;
first and second motors mounted to a chassis of the carriage;
a first mechanism coupled to the first motor and coupled to the first tread, wherein the first mechanism transfers motive power from the first motor to the first tread, said first mechanism including a first driven wheel being mounted at the front of its respective loop of said tread;
a second mechanism coupled to the second motor and coupled to the second tread, wherein the second mechanism transfers motive power from the second motor to the second tread; said second mechanism including a second driven wheel being mounted at the rear of its respective loop of said tread;
a source of electrical power mounted to the chassis; and
a control system coupled to the source of electrical power and coupled to the first and second motors for selectively energizing the first and second motors; and
the apparatus for training cutting horses further comprising a platform atop the motor-driven carriage supporting a visual target, said platform being sufficiently large so as to mask the underlying motor-driven carriage portion of the apparatus, including the treads, said visual target having a generally contiguous side such that the visual target as a whole presents a substantially solid-sided appearance to a horse.

2. The apparatus of claim 1, wherein the visual target comprises a representation of an animal.

3. The apparatus of claim 1, wherein the visual target as a whole presents the overall appearance of a barrel.

4. The apparatus of claim 1, wherein the control system comprises a remote-control radio receiver coupled to a motor control circuit, and wherein the motor control circuit controls application of electrical power to the first and second motors.

5. The apparatus for training horses defined in claim 1, wherein said source of electrical power includes a battery, the center of gravity of said battery being centrally mounted with respect to the respective centers of gravity of each of said first and second motors.

6. The apparatus for training horses defined in claim 1, wherein said first mechanism further includes a third motor and a third driven wheel being mounted at the rear of its respective loop of said first flexible tread and further being driven by said third motor; and
said second mechanism further includes a fourth motor and a fourth driven wheel being mounted at the front of its respective loop of said second flexible tread and further being driven by said fourth motor.

7. The apparatus of claim 1, wherein the treads of said apparatus are maintained using a plurality of idler wheels on the lower medial portion of the treads so as to increase surface traction and decrease noise during movement.

8. An apparatus for training horses, comprising:
a motor-driven carriage, comprising:
a first motorized drive mechanism mounted to the motor-driven carriage, comprising a first motor, a first intervening mechanical driving apparatus operatively coupled to the first motor, and a first final drive tread coupled to the first intervening mechanical driving apparatus, wherein the first final drive tread is configured to contact the ground beneath the carriage and wherein said first final drive tread forms a loop which is generally elongated in the front to back direction and wherein said first intervening mechanical driving apparatus includes a first driven wheel mounted at the front of said loop of said first final drive tread to directly drive said first final drive tread;
a second motorized drive mechanism mounted to the motor-driven carriage, comprising a second motor, a second intervening mechanical driving apparatus operatively coupled to the second motor, and a second final drive tread coupled to the second intervening mechanical driving apparatus, wherein the second final drive tread is configured to contact the ground beneath the carriage and wherein said second final drive tread forms a loop which is generally elongated in the front to back direction and wherein said second intervening mechanical driving apparatus includes a second driven wheel mounted at the rear of said loop of said second final drive tread to directly drive said second final drive tread; and
an electrical control system comprising at least one battery, the control system further comprising two or more electrical switches operable to apply electrical power from the battery to at least one motor; and
the apparatus for training cutting horses further comprising a platform atop the motor-driven carriage supporting a visual target, said platform being sufficiently large so as to mask the underlying motor-driven carriage portion of the apparatus, including the treads, said visual target having a generally contiguous side such that the visual target as a whole presents a substantially solid-sided appearance to a horse.

9. The apparatus for training horses defined in claim 8, wherein the center of gravity of said battery is centrally mounted with respect to the respective centers of gravity of each of said first and second motorized drive mechanisms.

10. The apparatus of claim 8, wherein the treads of said apparatus are maintained using a plurality of idler wheels on the lower medial portion of the treads so as to increase surface traction and decrease noise during movement.

11. An apparatus for training horses, comprising:
a motor-driven carriage, comprising:
first and second flexible treads disposed on either side of the carriage and wherein at least a portion of each tread may contact the ground;
first and second motors mounted to a chassis of the carriage;
a first mechanism coupled to the first motor and coupled to the first tread, wherein the first mechanism transfers motive power from the first motor to the first tread;
a second mechanism coupled to the second motor and coupled to the second tread, wherein the second mechanism transfers motive power from the second motor to the second tread;
a source of electrical power mounted to the chassis; and
a control system coupled to the source of electrical power and coupled to the first and second motors for selectively energizing the first and second motors;
the apparatus for training cutting horses further comprising a platform atop the motor-driven carriage supporting a barrel-shaped visual target, said platform being sufficiently large so as to mask the underlying motor-driven carriage portion of the apparatus, including the treads, said visual target having a generally contiguous side such that the visual target as a whole presents a substantially solid-sided appearance to a horse.

12. The apparatus of claim 11, wherein the treads of said apparatus are maintained using a plurality of idler wheels on the lower medial portion of the treads so as to increase surface traction and decrease noise during movement.

13. A method of training horses using a motor driven carriage, said motor-driven carriage comprising:
first and second flexible treads disposed on either side of the carriage and wherein at least a portion of each tread may contact the ground and wherein each of said first and second flexible treads forms a loop which is generally elongated in the front to back direction;
first and second motors mounted to a chassis of the carriage;
a first mechanism coupled to the first motor and coupled to the first tread, wherein the first mechanism transfers motive power from the first motor to the first tread, said first mechanism including a first driven wheel being mounted at the front of its respective loop of said tread;
a second mechanism coupled to the second motor and coupled to the second tread, wherein the second mechanism transfers motive power from the second motor to the second tread; said second mechanism including a second driven wheel being mounted at the rear of its respective loop of said tread;
a source of electrical power mounted to the chassis; and
a control system coupled to the source of electrical power and coupled to the first and second motors for selectively energizing the first and second motors;
a platform atop the motor-driven carriage for supporting a visual target having a form normally regarded by the horse as of a type fixed in place and a generally contiguous side such that the visual target as a whole presents a substantially solid-sided appearance to a horse;
upon a horse approaching said visual target, moving of the visual target using the remote controller in an manner that is not readily predictable by the horse and,
repeating the foregoing step until the horse becomes familiar with the visual target, the expected approach to the visual target, and the desired outcome.

\* \* \* \* \*